Dec. 18, 1928. Re. 17,166

T. DE LA MARE

PROCESS FOR REPAIRING PIPES

Original Filed June 11, 1924

INVENTOR
THOMAS DE LA MARE,
BY
H. Mainwaring
ATTORNEY

Reissued Dec. 18, 1928. Re. 17,166

UNITED STATES PATENT OFFICE.

THOMAS DE LA MARE, OF SALT LAKE CITY, UTAH.

PROCESS FOR REPAIRING PIPES.

Original No. 1,587,701, dated June 8, 1926, Serial No. 719,444, filed June 11, 1924. Application for reissue filed May 21, 1928. Serial No. 279,581.

This invention relates to a process for repairing pipes or other containers for liquid, and especially water when under pressure. The principal objects are, to provide:

First. A simple, rapid and economical method of renewing part or all of any pipe line or other liquid container, while in service.

Second. A method which shall be convenient and effectual.

Third. A method which shall not require highly skilled labor in its practice, and which shall not endanger the pipe line or other container, or the safety of the workmen while repairs are in progress.

Under almost any circumstances, leaks are liable to develop in pipe lines, common causes being decay in wooden pipes, and corrosion in metal pipes. Ordinarily, the flow of water in service pipes cannot be interrupted so as to give time for repairing them, thus resulting in a considerable and constant waste of water. Could the pipe be emptied, and remain empty long enough for the concrete to set, it would be an easy matter to form a concrete sleeve around the pipe to include the leaky area, and thus effect a most satisfactory repair or renewal.

When a pipe is in service, however, it becomes a different matter to form a concrete sleeve around a leaking portion, as the freshly placed concrete would be ruined by contact with the water issuing from the leak. To take care of such an emergency is the purpose of this invention, and by means of the present process, a pipe line can be effectually repaired while in service, in a way that makes the repaired portion at least as good as when new.

In carrying my improved process into effect, I provide what may be termed a "blister" with which to cover the pipe at the points where leaks may exist. Each blister may comprise a casing or jacket of metal sheets spaced apart from the outside surface of the pipe and closely sealed at the ends of the jacket so as to form a trap for any water that may be issuing from a leak in the pipe. The blister is provided with a drain so that any accumulating liquid may be conducted away. When the blister with its drain is in place on the pipe, and while the liquid is draining, a shell of plastic material, such as concrete, is formed around the blister, preferably extending somewhat beyond the ends thereof. When the concrete shell has set, the drain may be plugged, thereby permanently stopping the leakage.

The features of this invention for which the protection of Letters Patent is desired, are collectively grouped in the claims concluding this specification.

Figure 1:
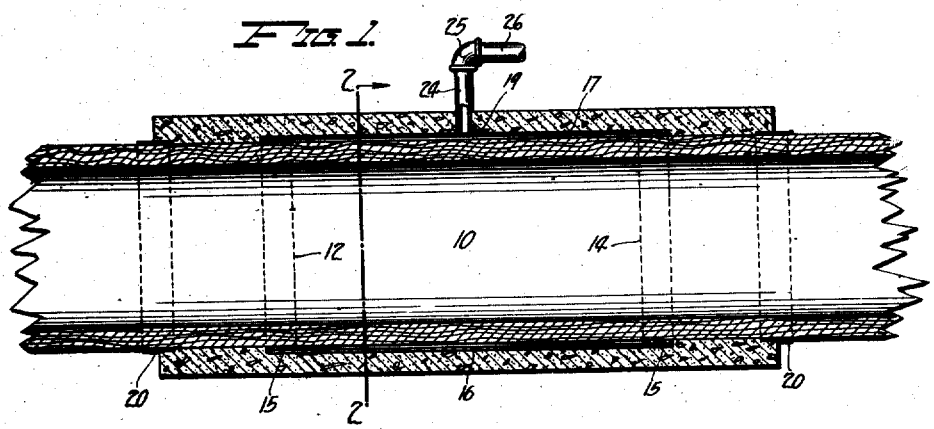
Figure 2:
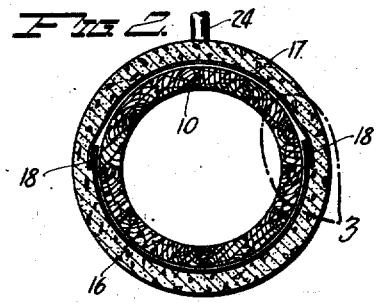
Figure 3:
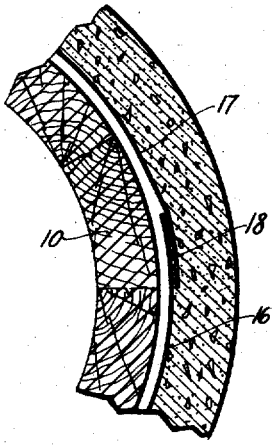
Figure 4:
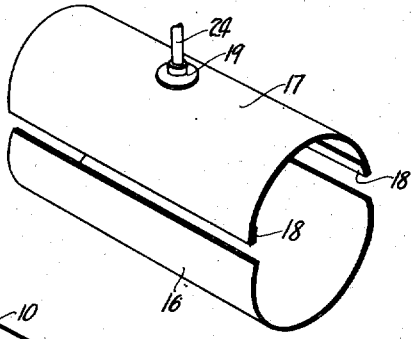

In the drawing, which illustrates merely one embodiment of an apparatus by which this invention may be carried into practice, Fig. 1 represents a longitudinal center section;

Fig. 2, a cross-section on line 2—2, Fig. 1;

Fig. 3, an enlargement of substantially that portion of Fig. 2 which is enclosed by the broken line 3;

Fig. 4, a view in perspective, of the parts of the jacket; and

Figure 5:
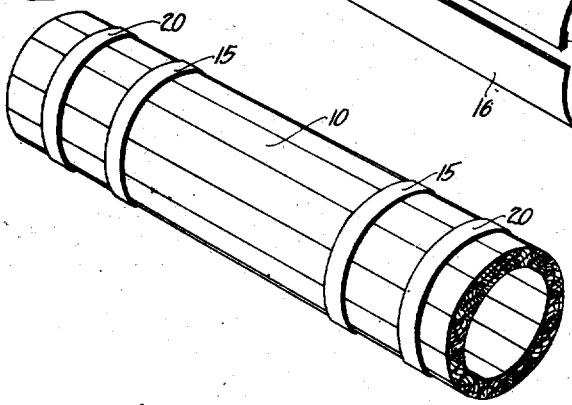

Fig. 5, a section of the pipe in perspective just before the jacket is applied thereto.

Referring to the drawing, the numeral 10 indicates a section of pipe, made for instance of wood staves. In this pipe, we will suppose, leaks have developed somewhere between the lines 12 and 14.

In repairing the pipe, I first form a blister over the part to be repaired. The blister may consist of two bands 15, of plastic cement, the sheets being a jacket made up of the two separable sheets 16 and 17 shaped to conform substantially to the required curvature, and bound tightly together by wires 25. The said bands extend around the pipe substantially along the lines 12 and 14 and therefore are spaced apart from each other longitudinally along the pipe. The bands provide bearings and seals for the longitudinal extremities of the jacket sheets, and serve to hold the latter spaced apart circumferentially, from the outer surface of the pipe 10, as shown in Fig. 1. Along the two inner longitudinal margins of the jacket sheet 17 are strips 18 of plastic cement, these strips being for the purpose of making tight joints between the respective sheets, as clearly shown in Fig. 2.

At some convenient point of the blister may be fastened a flange 19 in which is threaded the nipple 24 followed in turn, by the elbow 25 and the pipe 26, the latter extending to any convenient point of discharge.

After the blister with its drain has been put in place, the accumulating water is drained away, and while so draining, concrete or other like material is poured around the blister and around the drain nipple, to the desired thickness. After the concrete has set, the drain nipple is plugged, thus stopping the leakage.

The plugging may be accomplished by removing the pipe 26 and elbow 25 and screwing an ordinary pipe cap (not shown) onto the nipple, in the place of the elbow.

In order to be doubly sure of a good tight job, other bands 20, also of plastic cement, may be spaced apart outwardly from the bands 15, so as to form a liquidtight closure and elastic bearing for the ends of the finished shell.

Before applying the blister as above described, it may be desirable to thoroughly clean the surface of the pipe in the area to be repaired, and to cover this area with a liberal coat of creosote or other preservative.

While a specific embodiment of this invention is herein shown and described, it is to be clearly understood that all the detailed parts thereof, may or may not be shown in the preferred forms, and further, that the preferred forms may be varied from time to time, as the development of this invention and the arts to which it appertains, progress. Therefore, that which forms an essential and characteristic part of this invention, will be readily discernible from the claims in which its spirit is broadly generalized.

Having fully described my invention, what I claim is:

1. The process for repairing containers confining liquid while in service, comprising forming a blister over the part to be repaired, forming a plastic body to enclose said blister, and draining said blister during the period of time required for said plastic body to set.

2. The process of repairing leaks in a pipe conducting liquid under pressure, comprising forming a blister around the leaky portion of said pipe, forming a concrete shell around said blister, draining said blister while said concrete is setting, and plugging the drain from said blister after said concrete has set.

3. The method of repairing leaks in a container confining liquid under pressure, comprising forming a blister substantially liquidtight around said container and embracing the said leaks, placing a drain in said blister, forming a concrete jacket around the said blister and the said drain, drawing off the accumulating liquid through said drain while said concrete is setting, and plugging said drain after said concrete has set.

4. A method for repairing a pipe while conducting liquid under pressure, comprising forming a blister around said pipe, said blister comprising a jacket spaced radially apart from said pipe with a plastic substance filling the space between said jacket and said pipe at the ends of said jacket, placing a drain in said jacket, forming a shell of concrete around the said blister and drain, draining said blister while the said concrete is setting, and plugging said drain after said concrete has set.

5. A method for repairing leaks in pipes confining liquid, comprising placing a sheet jacket over the leakage area, said jacket being spaced apart from the outer surface of the pipe, sealing said jacket to said pipe, forming a shell of plastic concrete around said jacket and draining said jacket while said plastic concrete is setting.

In testimony whereof I sign my name hereto.

THOMAS DE LA MARE.